US012644990B2

(12) United States Patent
Ma

(10) Patent No.: US 12,644,990 B2
(45) Date of Patent: Jun. 2, 2026

(54) LASER TRANSCEIVER SYSTEM, LiDAR, AND AUTONOMOUS DRIVING APPARATUS

(71) Applicant: SUTENG INNOVATION TECHNOLOGY CO., LTD., Shenzhen (CN)

(72) Inventor: Dinglong Ma, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 923 days.

(21) Appl. No.: 17/951,177

(22) Filed: Sep. 23, 2022

(65) Prior Publication Data

US 2023/0014366 A1     Jan. 19, 2023

Related U.S. Application Data

(63) Continuation of application No. PCT/CN2020/083291, filed on Apr. 3, 2020.

(51) Int. Cl.
*G01S 17/931* (2020.01)
*B60W 60/00* (2020.01)
*G01S 7/481* (2006.01)

(52) U.S. Cl.
CPC .......... *G01S 17/931* (2020.01); *G01S 7/4814* (2013.01); *G01S 7/4816* (2013.01); *B60W 60/001* (2020.02); *B60W 2420/408* (2024.01)

(58) Field of Classification Search
None
See application file for complete search history.

(56) References Cited

U.S. PATENT DOCUMENTS

| | | | | |
|---|---|---|---|---|
| 2018/0275249 | A1* | 9/2018 | Campbell | ............. G01S 7/4865 |
| 2019/0011541 | A1* | 1/2019 | O'Keeffe | ............. G01S 7/4817 |

FOREIGN PATENT DOCUMENTS

| | | |
|---|---|---|
| CN | 110780283 A | 2/2020 |
| CN | 110940990 A | 3/2020 |

OTHER PUBLICATIONS

First Office Action of the Chinese application No. 202080005841.5, issued on Feb. 8, 2023. 11 pages.
Notice of Rejection of the Chinese application No. 202080005841. 5, issued on Nov. 28, 2023. 10 pages.
International search report and written opinion issued in corresponding International Application No. PCT/CN2020/083291, mailed Dec. 31, 2020, 10 pages.

* cited by examiner

*Primary Examiner* — Luke D Ratcliffe
(74) *Attorney, Agent, or Firm* — BAYES PLLC

(57) ABSTRACT

A laser transceiver system, a LiDAR, and an autonomous driving apparatus are provided. The laser transceiver system is applied to a LiDAR, including an emission module and a plurality of receiving modules corresponding to the emission module. The emission module is configured to emit an outgoing laser; the receiving module is configured to receive an echo laser; and the echo laser is a laser returning after the outgoing laser is reflected by an object in a detection region.

13 Claims, 25 Drawing Sheets

Field of view 2

Field of view 1

LASER TRANSCEIVER SYSTEM, LiDAR, AND AUTONOMOUS DRIVING APPARATUS

CROSS-REFERENCE TO RELATED APPLICATION

The present application is a continuation of International Application No. PCT/CN2020/083291, filed on Apr. 3, 2020, the content of which is incorporated herein by reference in its entirety.

TECHNICAL FIELD

Embodiments of the present disclosure relate to the technical field of radars, and in particular, to a laser transceiver system, a LiDAR, and an autonomous driving apparatus.

BACKGROUND

A LiDAR is a radar system using lasers to detect characteristics of a target object, such as position and speed. A working principle of the LiDAR is that an emission module first emits outgoing lasers for detection to the target, and a receiving module then receives echo lasers reflected from the target object, and processes the received echo lasers, to obtain relevant information of the target object, for example, parameters such as distance, azimuth, height, speed, attitude, and even shape.

One implementation of the receiving module is used as an array detector. A plurality of detection pixels are arranged into an array to form the array detector. In existing array detection technologies, a single-input single-output mode is usually used, that is, one emitter and an array detector corresponding to the emitter are integrated to form a ranging module, and each ranging module can implement different detection resolutions. To implement different detection resolutions for different detection regions, a plurality of ranging modules need to be integrated, thereby causing a larger product size.

SUMMARY

In view of the foregoing shortcomings in the prior art, embodiments of the present disclosure mainly aim to provide a laser transceiver system, a LiDAR, and an autonomous driving apparatus, which can provide different detection resolutions for different detection regions while reducing product size.

One technical solution of the embodiments of the present disclosure is to provide a laser transceiver system, applied to LiDAR, where the laser transceiver system includes an emission module and a plurality of receiving modules corresponding to the emission module, where:

the emission module is configured to emit an outgoing laser; and the plurality of receiving modules are configured to receive an echo laser, and the echo laser is a laser returning after the outgoing laser is reflected by an object in a detection region.

In some embodiments, the emission module includes a laser emission unit and an emission optical unit, and each receiving module includes a receiving optical unit and an array detector;

the laser emission unit is configured to emit an outgoing laser;

the emission optical unit is configured to: collimate the outgoing laser and emit a collimated outgoing laser to the detection region;

the receiving optical unit is configured to: focus the echo laser and emit a focused echo laser to the array detector; and the array detector is configured to receive the echo laser.

In some embodiments, detection fields of view of at least two of the plurality of receiving modules are overlapped.

Further, at least one of the plurality of receiving modules has a detection angle of view different from that of another receiving module.

Further, detection fields of view of at least two of the plurality of receiving modules are overlapped.

In some embodiments, the receiving optical unit is a lens module, and a lens module of at least one receiving optical unit has a focal length different from that of a lens module of another receiving optical unit.

In some embodiments, a pixel size of at least one array detector is different from a pixel size of another array detector.

In some embodiments, the receiving module includes the first receiving module, the second receiving module, and the third receiving module; and a detection field of view of the third receiving module is located within a detection field of view of the second receiving module, and the detection field of view of the second receiving module is located within the detection field of view of the first receiving module.

In some embodiments, the receiving module includes the first receiving module and the second receiving module, and there is shifting between the detection field of view of the first receiving module and the detection field of view of the second receiving module.

In some embodiments, the array detector of the first receiving module is the same as the array detector of the second receiving module, the two array detectors have the same pixel, and the detection field of view of the second receiving module is a detection field of view formed by shifting the detection field of view of the first receiving module by ½ pixel in a direction that forms an included angle of 45° with the horizontal direction.

In some embodiments, a light spot of the outgoing laser is the first light spot covering the entire detection field of view of the receiving module; or the light spot of the outgoing laser is the second light spot covering a part of the detection field of view of the receiving module, the second light spot is used to traversal-scan the entire detection field of view of the receiving module, and the receiving module is configured to: when the second light spot scans a specific region of the entire detection field of view, detect the region.

In some embodiments, the second light spot is a block light spot or a linear light spot.

An embodiment of the present disclosure further provides LiDAR, where the LiDAR includes the foregoing laser transceiver system, and the LiDAR further includes an emission drive system and a control and signal processing system;

the emission drive system is used to drive the emission module; and the control and signal processing system is used to control the emission drive system to drive the emission module, and to control the receiving module to receive the echo laser.

An embodiment of the present disclosure further provides an autonomous driving apparatus, including a driving apparatus body and the foregoing LiDAR, where the LiDAR is mounted on the drive apparatus body.

Beneficial effects of the embodiments of the present disclosure are as follows: in the embodiments of the present disclosure, the plurality of receiving modules corresponding to the single emission module is provided for the single emission module, and different receiving modules are designed, to provide different detection resolution for different detection regions. Because there is no need to provide a plurality of ranging modules with different resolutions, the number of product components is reduced, thereby reducing product size, which improves integration level and facilitates correction afterward.

BRIEF DESCRIPTION OF DRAWINGS

One or more embodiments are described by using examples with reference to diagrams in drawings corresponding to the embodiments. These example descriptions do not constitute a limitation to the embodiments. Elements with the same reference signs in the drawings indicate similar elements. Unless otherwise stated, the diagrams in the drawings do not constitute a proportional limitation.

FIG. 8b is a schematic diagram of a point cloud effect of the LiDAR in FIG. 8a;

FIG. 9b is a schematic diagram of a point cloud effect of the LiDAR in FIG. 9a;

FIG. 10b is a schematic diagram of a point cloud effect of the LiDAR in FIG. 10a;

FIG. 11b is a schematic diagram of a point cloud effect of the LiDAR in FIG. 11a;

Figure 1:
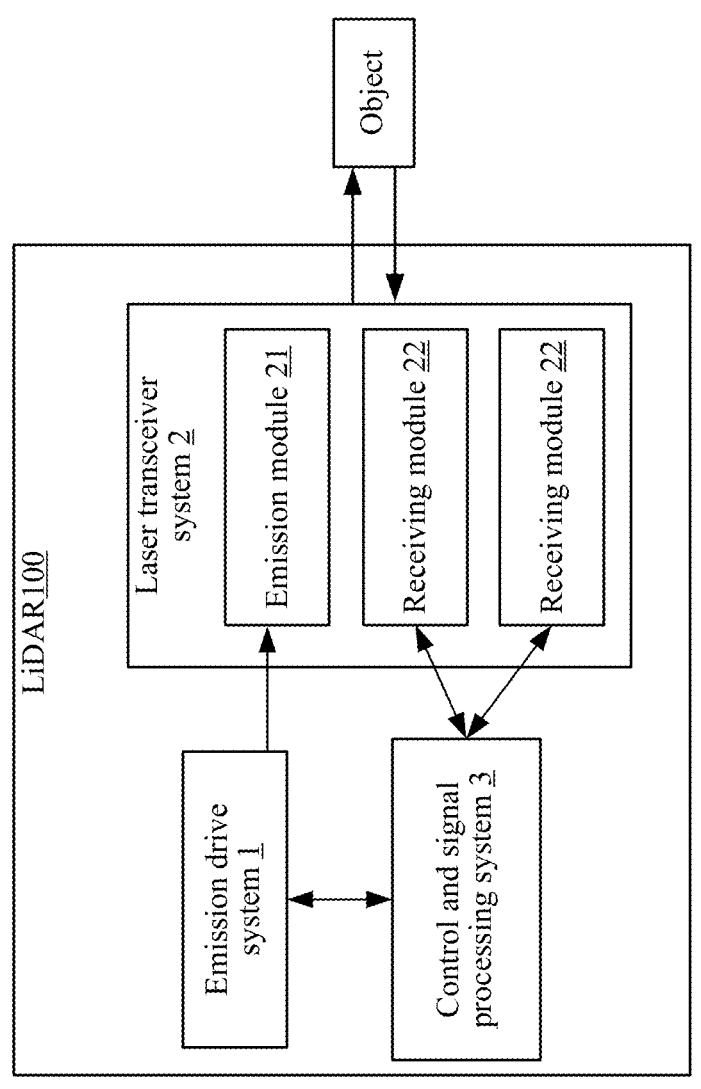
FIG. 1 is a structural block diagram of a LiDAR according to an embodiment of the present disclosure.

Reference signs in the specific embodiments are as follows:

LiDAR 100, emission drive system 1, laser transceiver system 2, control and signal processing system 3, emission module 21, receiving module 22, laser emission unit 211, emission optical unit 212, receiving optical unit 221, array detector 222, autonomous driving apparatus 200, and driving apparatus body 201.

DETAILED DESCRIPTION

Embodiments of the technical solution of the present disclosure are described in detail below in conjunction with the drawings. The following embodiments are only used to describe the technical solutions of the present disclosure more clearly, hence are only used as examples, and cannot be used to limit the protection scope of the present disclosure.

It should be noted that unless otherwise specified, the technical or scientific terms used in the present disclosure should have general meanings understood by a person of ordinary skill in the art to which the present disclosure belongs.

In the description of the present disclosure, it should be understood that orientations or position relationships indicated by terms such as "center", "longitudinal", "lateral", "length", "width", "thickness", "above", "under", "front", "rear", "left", "right", "vertical", "horizontal", "top", "bottom", "inner", "outer", "clockwise", "counterclockwise", "axial", "radial", and "circumferential" are based on the orientations or position relationships shown in the drawings, are merely intended to describe the present disclosure and simplify the descriptions, but are not intended to indicate or imply that the indicated device or element shall have a specific orientation or be formed and operated in a specific orientation, and therefore cannot be understood as a limitation to the present disclosure.

In addition, the terms such as "first" and "second" are merely intended for a purpose of description, and shall not be understood as an indication or implication of relative importance or implicit indication of a quantity of indicated technical features. In the descriptions of the present disclosure, "a plurality of" and "several" means two or more (including two), unless otherwise specified.

In the present disclosure, unless otherwise clearly specified and limited, terms such as "mounting", "connected", "connection", and "fixing" shall be understood in a general sense. For example, these technical terms may be a fixed connection, a detachable connection, or an integrated connection; or may be a mechanical connection or an electrical connection; or may be a direct connection, an indirect connection by using an intermediate medium, or an internal communication of two elements or an interaction of two elements. A person of ordinary skill in the art may understand specific meanings of the foregoing terms in the present disclosure according to a specific situation.

In the present disclosure, unless otherwise clearly specified and defined, that a first feature is "above" or "under" a second feature may be that the first feature and the second feature are in direct contact, or the first feature and the second feature are in indirect contact through an intermediate medium. Moreover, that a first feature is "above", "over", and "on" a second feature may mean that the first feature is right above or diagonally above the second feature, or may merely indicate that a horizontal height of the first feature is greater than that of the second feature. That a first feature is "below", "under", and "beneath" a second feature may mean that the first feature is right below or diagonally below the second feature, or may merely indicate that a horizontal height of the first feature is less than that of the second feature.

As shown in FIG. 1, an embodiment of the present disclosure provides a LiDAR 100. The LiDAR includes an emission drive system 1, a laser transceiver system 2 and a control and signal processing system 3. The laser transceiver system 2 includes one emission module 21 and two receiving modules 22 corresponding to the emission module 21. The emission module 21 is configured to emit an outgoing laser, and the receiving module 22 is configured to receive an echo laser. The emission drive system 1 is used to drive the emission module 21. The control and signal processing system 3 is used to control the emission drive system 1 to drive the emission module 21, and to control the receiving module 22 to receive the echo laser. The echo laser is a laser returning after the outgoing laser is reflected by an object in the detection region.

In this embodiment of the present disclosure, one emission module 21 is corresponding to two receiving modules 22, that is, the two receiving modules 22 jointly detect a coverage region of the outgoing laser emitted by the emission module 21. In another embodiment, one emission module may also be corresponding to more than two receiving modules 22, for example, three, four, five, or more receiving modules.

Figure 2:
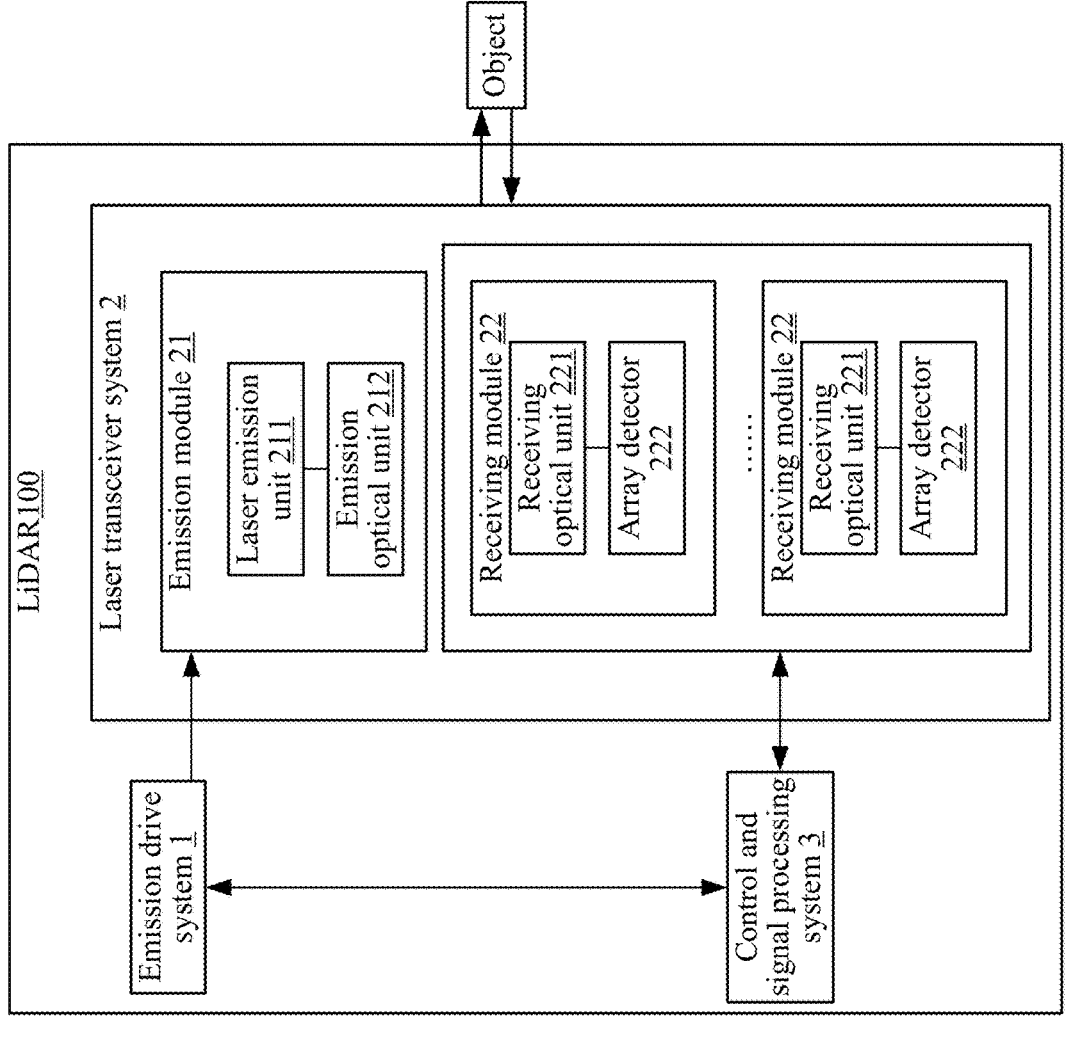
FIG. 2 is a structural block diagram of a LiDAR according to another embodiment of the present disclosure.

As shown in FIG. 2, the emission module 21 includes a laser emission unit 211 and an emission optical unit 212. The laser emission unit 211 is configured to emit the outgoing laser, and the emission optical unit 212 is configured to collimate the outgoing laser, and emit a collimated outgoing laser to the detection region. The laser emission unit 211 may be various types of signal light sources, such as a Laser Diode (LD), a Vertical Cavity Surface Emitting Laser (VCSEL), an Edge Emitting Laser (EEL), a Light Emitting Diode (LED) fiber and other devices. The emission optical unit 212 may be an optical fiber, a spherical lens group, a separate spherical lens group, or a cylindrical lens group, and the like.

The control and signal processing system 3 may be a Field Programmable Gate Array (FPGA). The FPGA is connected to the emission drive system 1, to control emission of the outgoing laser. The FPGA is also connected to a clock pin, a data pin, and a control pin of the receiving module 22 separately, to control receiving of the echo laser.

The laser transceiver system 2 is described in detail below.

Further referring to FIG. 2, in the laser transceiver system 2, each receiving module 22 includes a receiving optical unit 221 and an array detector 222. The receiving optical unit 221 is configured to: focus the echo laser and emit a focused echo laser to the array detector 222. The array detector 222 is configured to receive the echo laser. The receiving optical unit 221 can be a spherical lens, a spherical lens group, a cylindrical lens group, or the like. The array detector 222 may be a receiving device that can form an array, such as an Avalanche Photo Diode (APD) array, a Silicon Photomultiplier (SiPM), a Multi-Pixel Photon Counter (MPPC) array, or a photomultiplier tube (PMT) array, a single-photon avalanche diode (SPAD) array, Charge-coupled Device (CCD), Complementary Metal Oxide Semiconductor (CMOS), or the like.

Figure 3A:
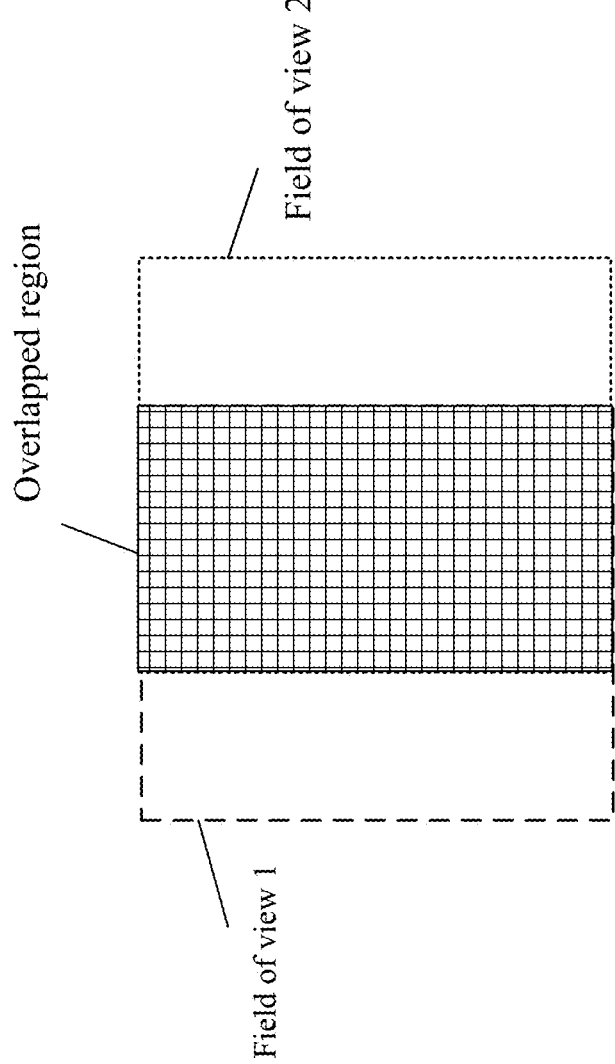
FIG. 3a is a schematic diagram of overlapping of detection fields of view of two receiving modules according to an embodiment of the present disclosure.
Figure 3B:
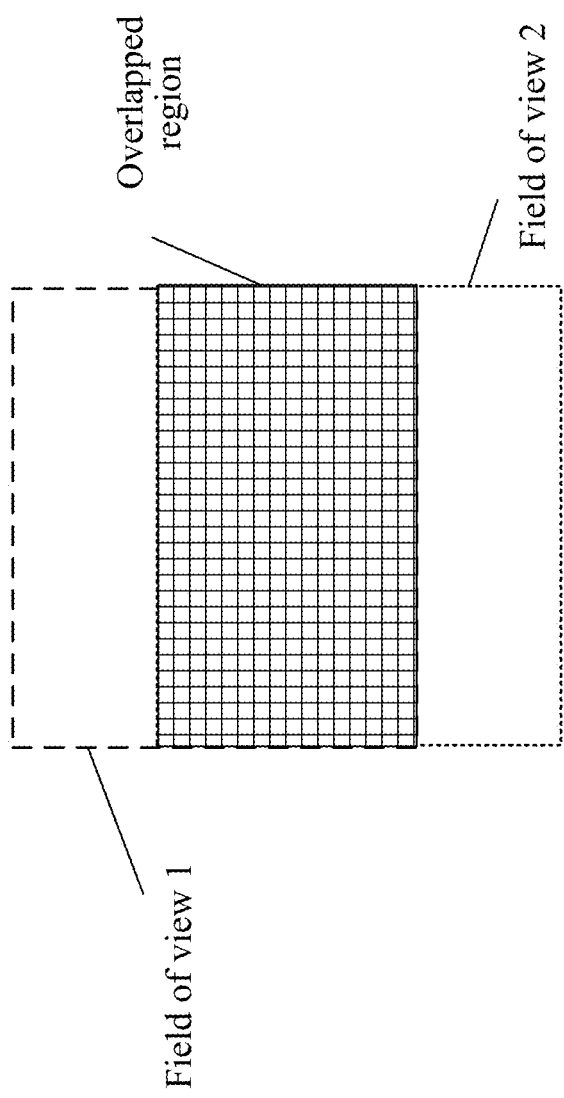
FIG. 3b is a schematic diagram of overlapping of detection fields of view of two receiving modules according to another embodiment of the present disclosure.
Figure 3C:
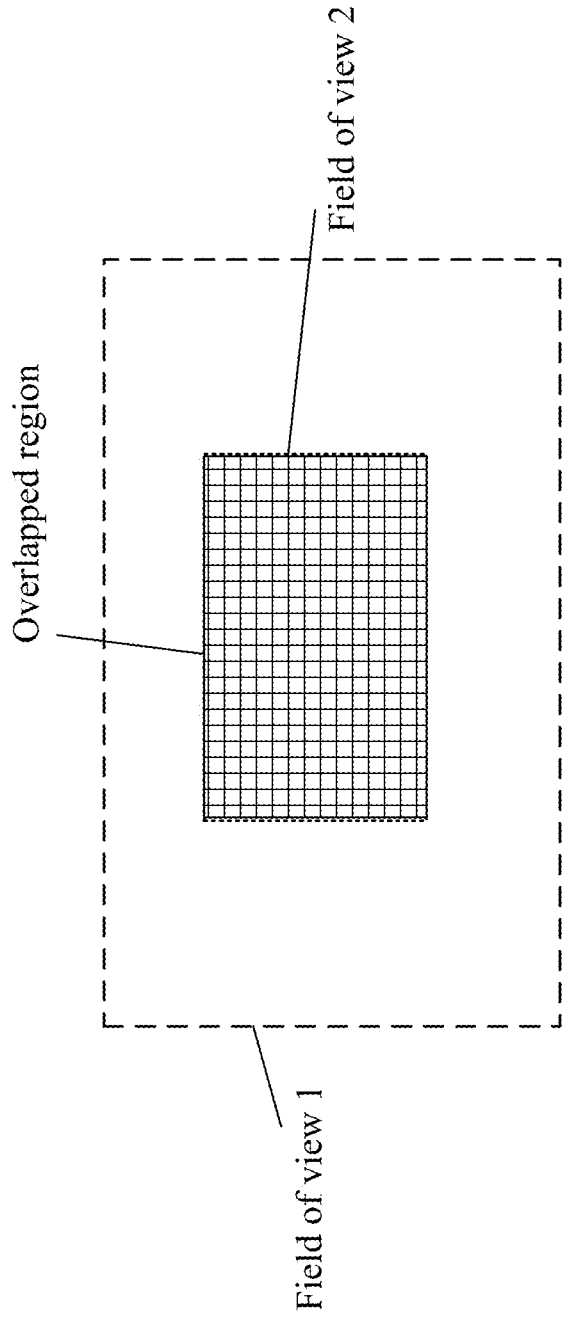
FIG. 3c is a schematic diagram of overlapping of detection fields of view of two receiving modules according to still another embodiment of the present disclosure.
Figure 4A:
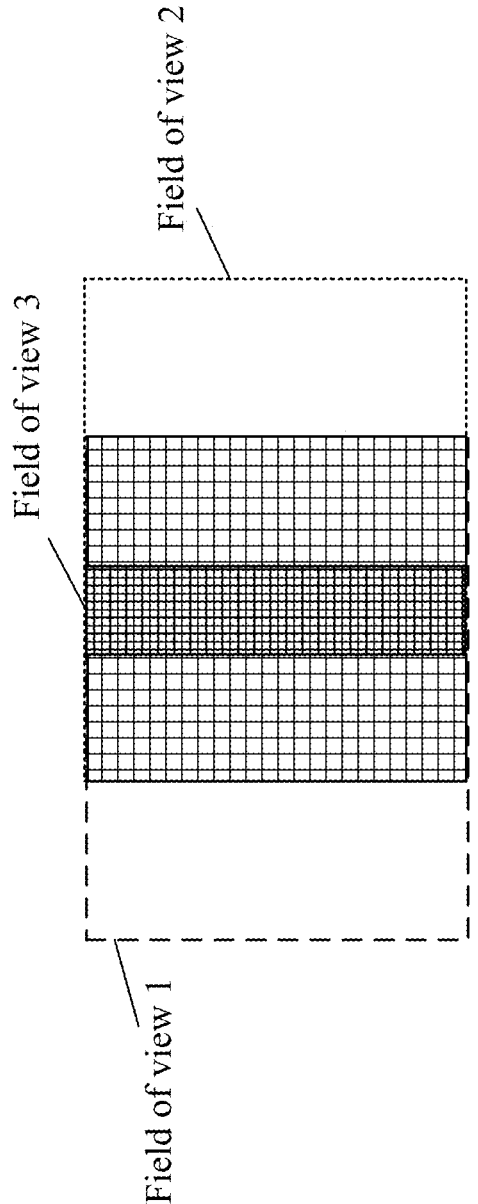
FIG. 4a is a schematic diagram of overlapping of detection fields of view of three receiving modules according to an embodiment of the present disclosure.
Figure 4B:
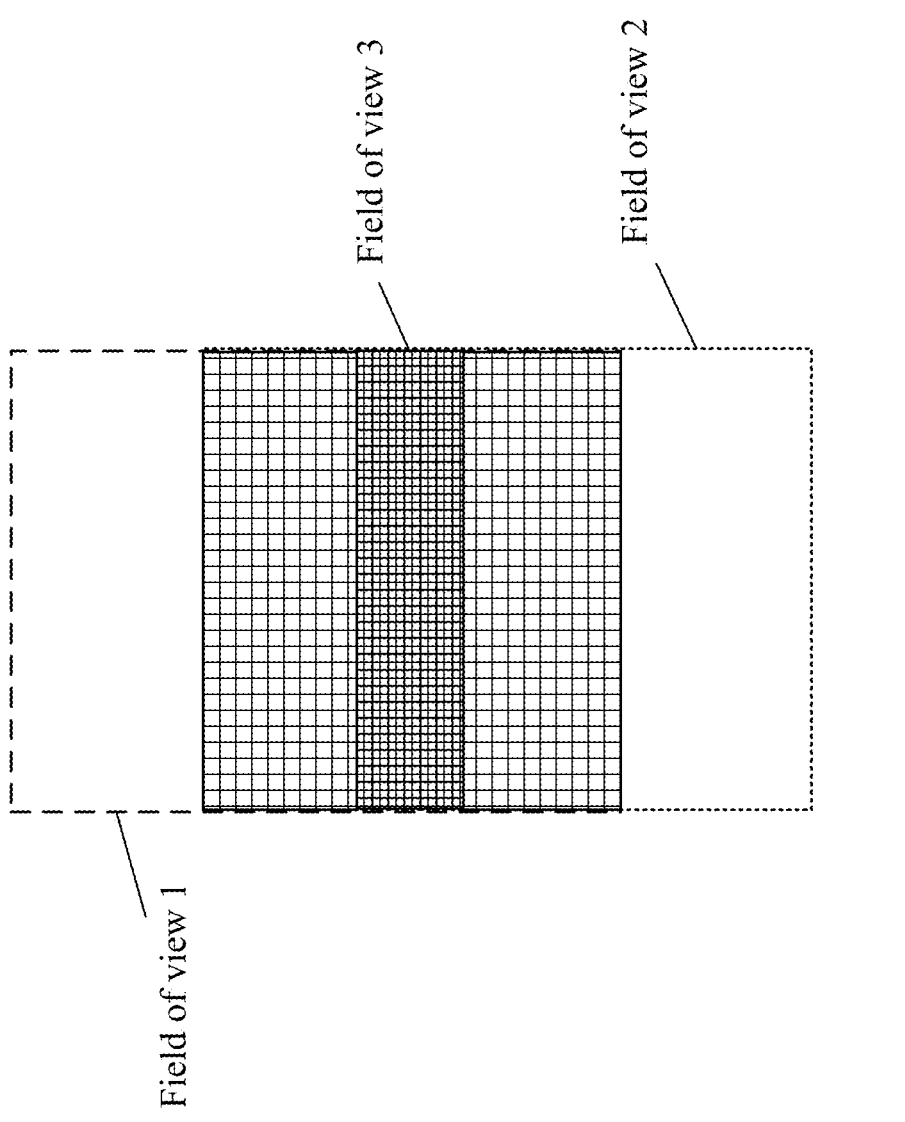
FIG. 4b is a schematic diagram of overlapping of detection fields of view of three receiving modules according to another embodiment of the present disclosure.
Figure 4C:
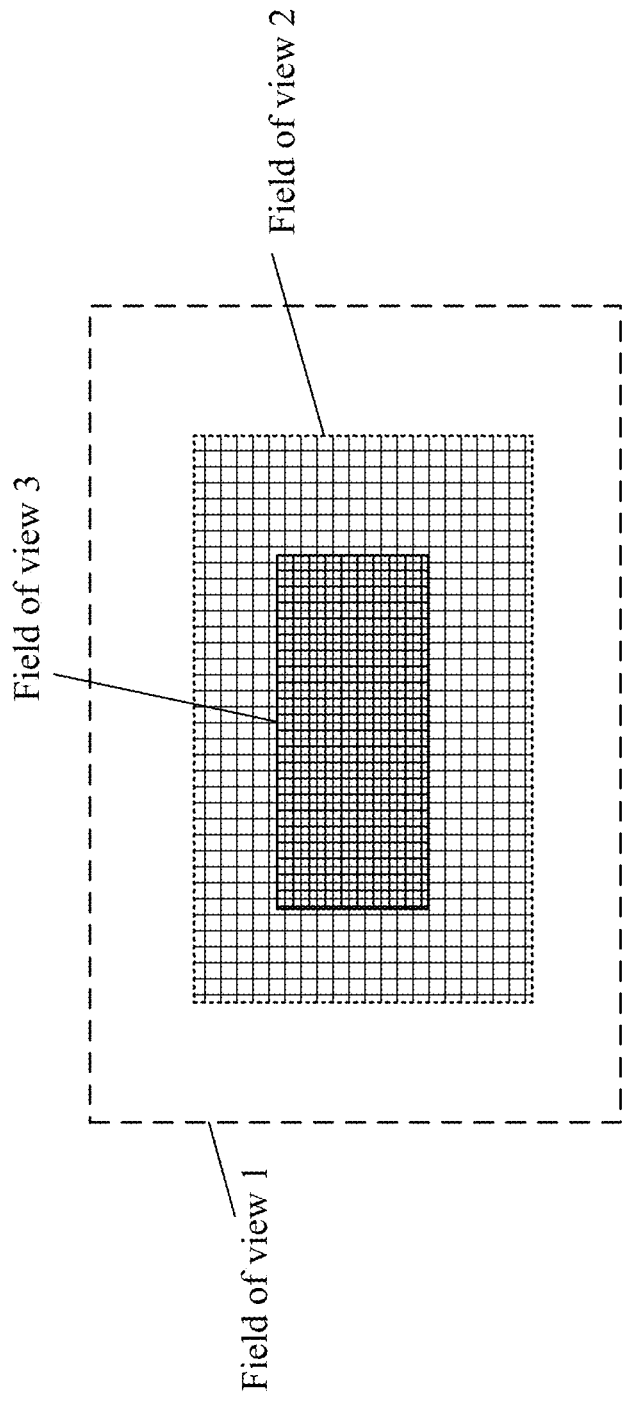
FIG. 4c is a schematic diagram of overlapping of detection fields of view of three receiving modules according to still another embodiment of the present disclosure.

Detection fields of view of receiving modules 22 can be overlapped, and the overlapped region includes a Region of Interest (ROI), and angular resolution for the ROI region is greater than angular resolution for another region, thereby satisfying a scanning requirement for a key detection region. Detection fields of view of the receiving modules 22 may not be overlapped, and the two non-overlapped detection fields of view may be spliced into one integrated detection field of view. When the detection fields of view of the receiving modules 22 are not overlapped, a receiving module 22 with a higher resolution can be used to target the ROI region for detection, thereby satisfying a scanning requirement for a key detection region. In this embodiment of the present disclosure, the detection fields of view of the two receiving modules 22 are overlapped. FIG. 3a to FIG. 3c are schematic diagrams of overlapping of detection fields of view of two receiving modules 22. In another embodiment, the laser transceiver system 2 includes one emission module 21 and three receiving modules 22 corresponding to the emission module 21. FIG. 4a to FIG. 4c are schematic diagrams of overlapping of detection fields of view of three receiving modules 22. In the schematic diagram of the overlapping of the fields of view, a grid area is an overlapped region. The denser the grid, the higher the resolution for the overlapped region. In these embodiments of the overlapped fields of view, because the angles of view formed by the plurality of receiving modules 22 are overlapped, the integrated horizontal angle of view formed by the plurality of receiving modules 22 helps avoid missing detection due to a gap between the fields of view; otherwise, detection reliability is affected. Horizontal angles of view may be overlapped, that is, the angles of view formed by the plurality of receiving modules 22 are overlapped in the horizontal direction (shown in FIG. 3a and FIG. 4a); or vertical angles of view are overlapped, that is, the angles of view formed by the plurality of receiving modules 22 are overlapped in the vertical direction (shown in FIG. 3b and FIG. 4b); or the angles of view are overlapped in both the horizontal direction and the vertical direction (shown in FIG. 3c and FIG. 4c).

Figure 5A:
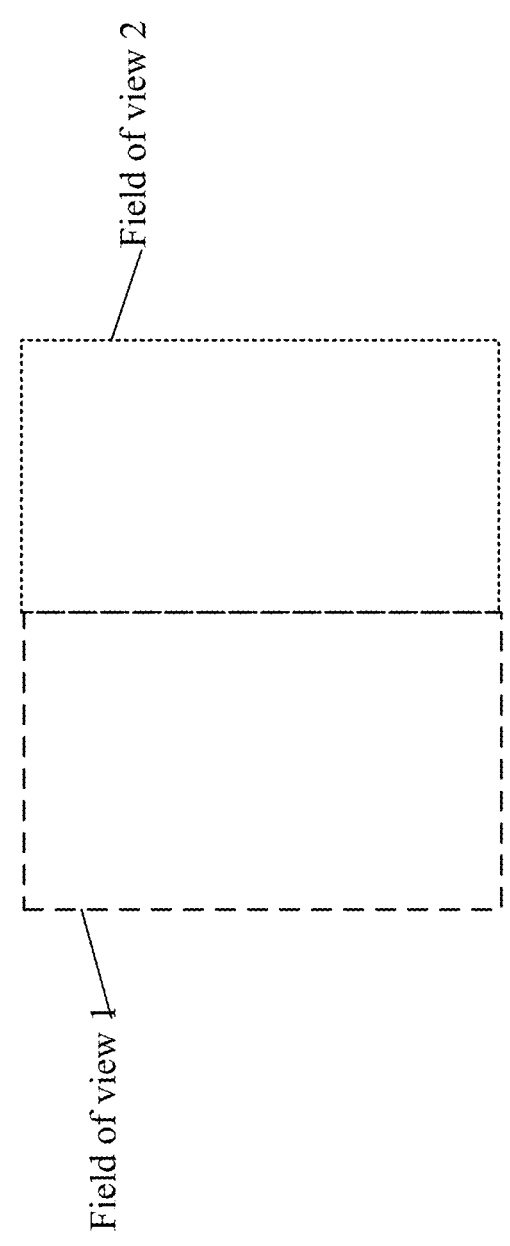
FIG. 5a is a schematic diagram of non-overlapping of detection fields of view of two receiving modules according to an embodiment of the present disclosure.
Figure 5B:
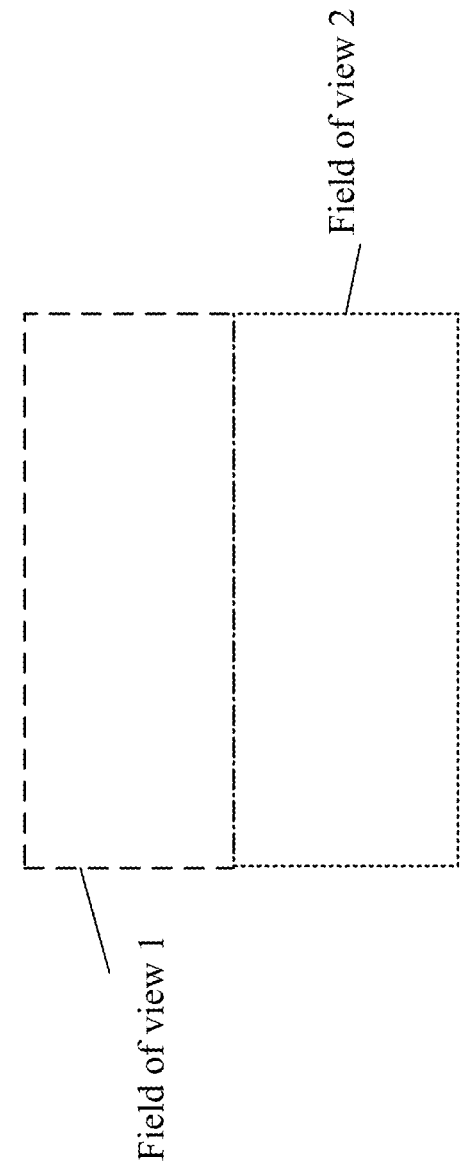
FIG. 5b is a schematic diagram of non-overlapping of detection fields of view of two receiving modules according to another embodiment of the present disclosure.

In other embodiments, the detection fields of view of the plurality of receiving modules 22 may not be overlapped. As shown in FIG. 5a and FIG. 5b, the laser transceiver system 2 includes one emission module 21 and two receiving modules 22 corresponding to the emission module 21. Detection fields of view of the two receiving modules 22 are not overlapped and are spliced into one integrated detection field of view. Overlapping manners of the detection fields of view of the receiving modules 22 are as follows:

1. When the laser transceiver system 2 is assembled, the position and angle of each receiving module 22 are adjusted, to adjust a region covered by the detection fields of view of the receiving modules 22, so that the detection fields of view of the receiving modules 22 are overlapped; and the position and the angle of each receiving module 22 can be designed in advance, as long as the detection fields of view of the receiving modules 22 are overlapped; and the receiving module 22 is mounted based on the pre-designed position and angle.

2. At least one of the receiving modules 22 is adjusted to have a detection angle of view different from that of another receiving module 22. When the detection angles of view are different, the detection fields of view of the receiving modules 22 cover different regions, so that the detection fields of view of the receiving modules 22 are overlapped.

In some embodiments, when the receiving optical unit 221 is a lens module, a lens module of at least one receiving module 22 has a focal length different from that of a lens module of another receiving module 22, so that the at least one receiving module 22 has a detection angle of view different from that of another receiving module 22 and the detection fields of view of the receiving modules 22 are overlapped.

When having different detection angles of view, the same array detector 222 has different detection angular resolution. The same array detectors 222 have the same number of pixels. Therefore, when having the same detection angle of view, the array detectors 222 also have the same pixel size. However, when the array detectors 222 have different detection angles of view, the pixel size is increased or decreased correspondingly along with the increase or decrease in the detection angle of view, which causes decrease or increase in the angular resolution of the array detector 222 correspondingly.

The foregoing two methods can also be used in combination, so that the detection fields of view of the receiving module 22 are overlapped. In addition, with the detection fields of view of the receiving modules 22 overlapped, a detection angle of view of one or more receiving modules 22 can be further adjusted, to further improve the resolution for the overlapped region. In addition, when the detection fields of view of the receiving modules 22 are not overlapped, a detection angle of view of one or more receiving modules 22 can also be adjusted, to improve resolution for a corresponding detection region.

In this embodiment of the present disclosure, angular resolution may be adjusted for different detection regions. For example, based on a requirement for the angular resolution for the detection region, a position and an angle of each receiving module 22 are adjusted, to adjust a region covered by a detection field of view of each receiving module 22, so that different detection regions are jointly detected by different numbers of array detectors 222, thereby finally adjusting angular resolution for different detection regions. For another example, based on a requirement for the angular resolution for the detection region, a focal length of the lens module of the receiving optical unit 221 is adjusted, to adjust the detection angle of view of the receiving module 22, so that a region covered by a detection field of view of the receiving module 22 is adjusted, thereby finally adjusting the angular resolution for different detection regions.

In some embodiments, the laser transceiver system 2 includes one emission module 21 and three receiving modules 22 corresponding to the emission module 21, and the three receiving modules 22 are respectively the first receiving module 22A, the second receiving module 22B, and the third receiving module 22C. The detection field of view of the third receiving module 22C is located within a detection field of view of the second receiving module 22B, and the detection field of view of the second receiving module 22B is located within the detection field of view of the first receiving module 22A. Because a region in which the detection field of view of the third receiving module 22C is located is jointly detected by the first receiving module 22A, the second receiving module 22B, and the third receiving module 22C, the detection angular resolution for the region is the highest; a detection region in a detection region of the second receiving module 22B other than a detection region of the third receiving module 22C is jointly detected by the first receiving module 22A and the second receiving module 22B, and therefore, detection angular resolution for the region is second highest; and a detection region in a detection region of the first receiving module 22A other than the detection region of the second receiving module 22B is exclusively detected by the first receiving module 22A, and therefore, the detection angular resolution for the region is the lowest.

Figure 6:
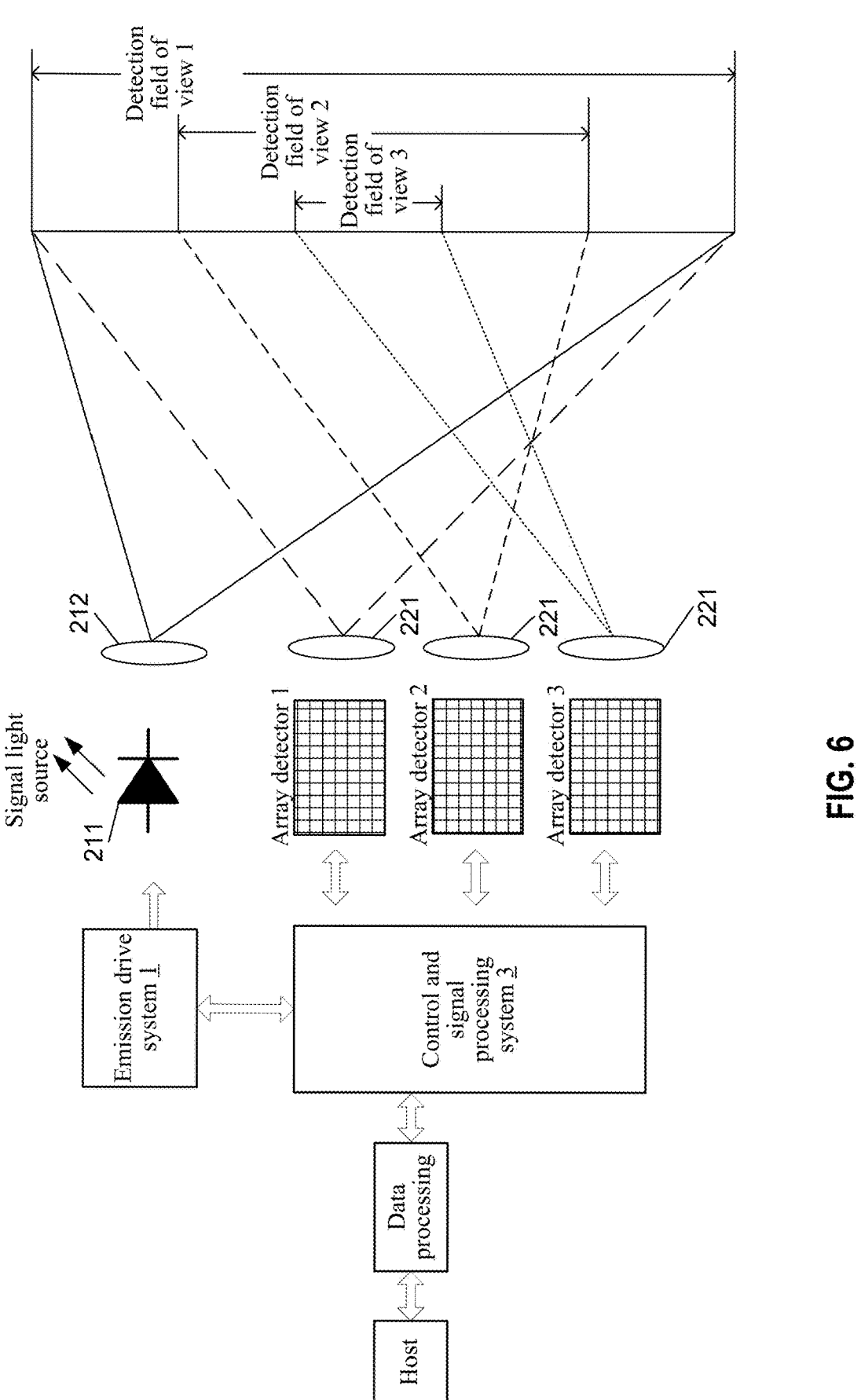
FIG. 6 is a schematic diagram of an optical path of a LiDAR having three receiving modules according to an embodiment of the present disclosure.

In an embodiment, as shown in FIG. 6, LiDAR 100 includes an emission drive system 1, a laser emission unit 211, an emission optical unit 212, three receiving modules 22, and a control and signal processing system 3 shared by the three receiving modules 22. The emission drive system 1 is a laser-driven system, the laser emission unit 211 is LD, VCSEL, or LED, the emission optical unit 212 is an optical shaping device, and the receiving module 22 includes an array detector and a receiving lens. The array detector includes an array detector 1, an array detector 2, and an array detector 3.

Figure 7A:
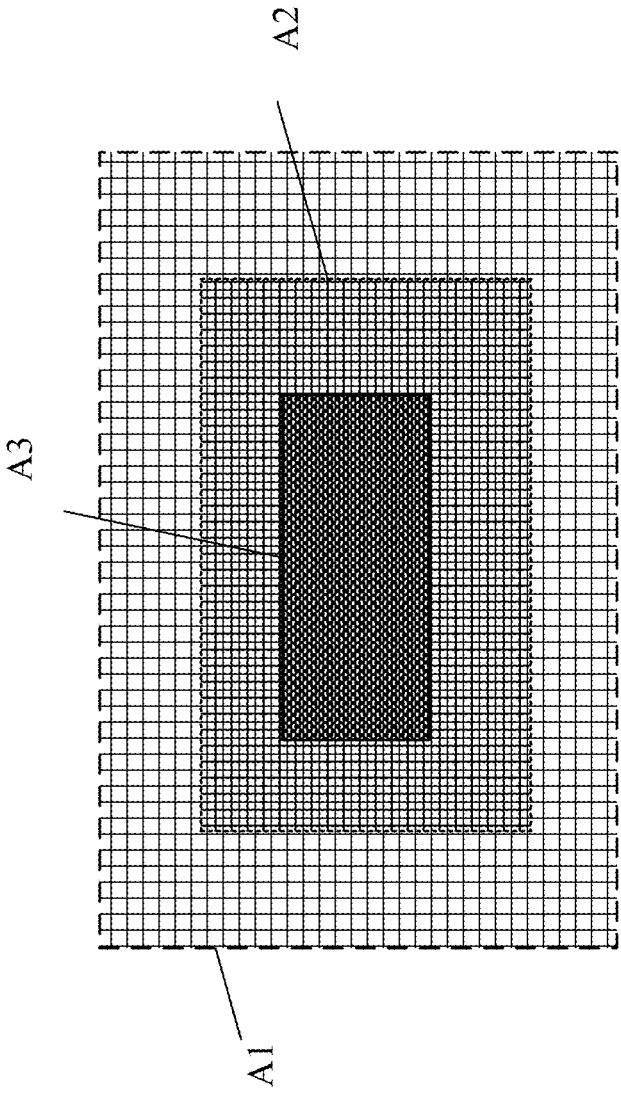
FIG. 7a is a schematic diagram of a detection field of view of the LiDAR in FIG. 6.

In some embodiments, as shown in FIG. 7a, each grid in the figure is a pixel of an array detector. Divergence angles of the laser and the optical shaping device covers the entire detection region (120*90°). Three identical array detectors use three sets of different optical lenses (a ratio of focal lengths of the optical lenses is basically equal to 1:2:3) to implement different detection angles of view: 120*90°, 80*60°, and 40*30°, and detect different regions: the first detection region A1, the second detection region A2, and the third detection region A3. Detection distances in the three detection regions are the same. However, due to the difference in the detection angles of view, the angular resolution of the three array detectors within the detection region is increased in proportion sequentially from the array detector 1 with the largest detection angle of view to the array detector 3 with the smallest detection angle of view.

In this embodiment, the detection angular resolution is improved not only because the overlapped detection region is detected by two or three array detectors together, but also because the overlapped detection region is detected by the array detector with higher angular resolution.

Figure 7B:
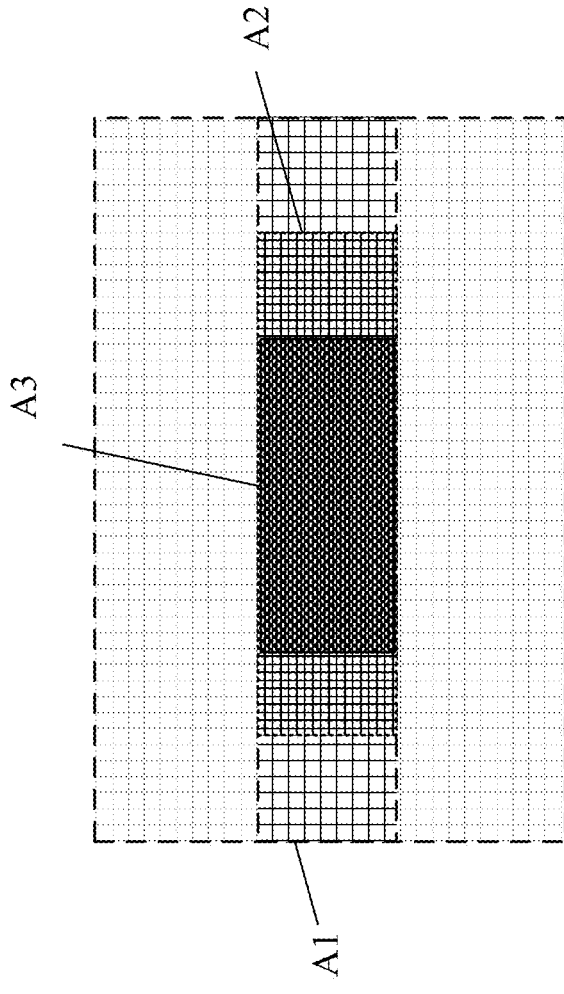
FIG. 7b is a schematic diagram of another detection field of view of the LiDAR in FIG. 6.

In addition, selective reading processing can be performed for a region with a large angle of view, to reduce a system computing capability requirement. For example, the laser and the optical shaping device are adjusted, to set a coverage region of a laser spot as a narrow region (120*30°), and the detection angles of view of the three array detectors are: 120*90°, 80*60°, and 40*30°, respectively. As shown in FIG. 7b, the detection regions include the first detection region B1, the second detection region B2 and the third detection region B3. Each grid in the figure is a pixel of one array detector, a light-colored grid region in the figure is a region that is not covered by the laser spot, and the region is not detected. In the vertical direction, the detection angle of view of the first detection region B1 is reduced from 90° in the foregoing embodiment to only 30° in the middle during reading, and the detection angle of view of the second detection region B2 is also reduced from 60° in the foregoing embodiment to only 30° in the middle during reading.

In addition, different devices can be selected as the array detector, and the detection distance varies based on the selection of the device. For example, in two array detectors, when a pixel size of one array detector is twice that of the other array detector and the array detectors have the same image plane size, an angular resolution of the array detector is theoretically once less than that of the other array detector. When the two array detectors use the same optical lens, the array detector can implement a detection distance twice that of the other array detector. In the foregoing manner, requirements for different detection distances can be satisfied. Therefore, in some embodiments, image plane sizes of all array detectors are the same, and a pixel size of at least one array detector is different from a pixel size of another array detector, so that a detection distance of the array detector is different from that of another array detector. In other embodiments, the array detectors may have different pixel sizes and image plane sizes. For example, in two array detectors, one array detector has a pixel size twice that of the other array detector, but has an image plane size half of that of the other array detector, and therefore, angular resolution of the array detector is theoretically four times lower than that of the other array detector. When the two array detectors use the same optical lens, the array detector can implement a detection distance four times that of the other array detector.

An embodiment of the present disclosure further provides another LiDAR 100, and a laser transceiver system 2 in the LiDAR 100 includes one emission module 21 and two receiving modules 22. There is an offset between the detection fields of view of these two receiving modules 22.

Figure 8A:
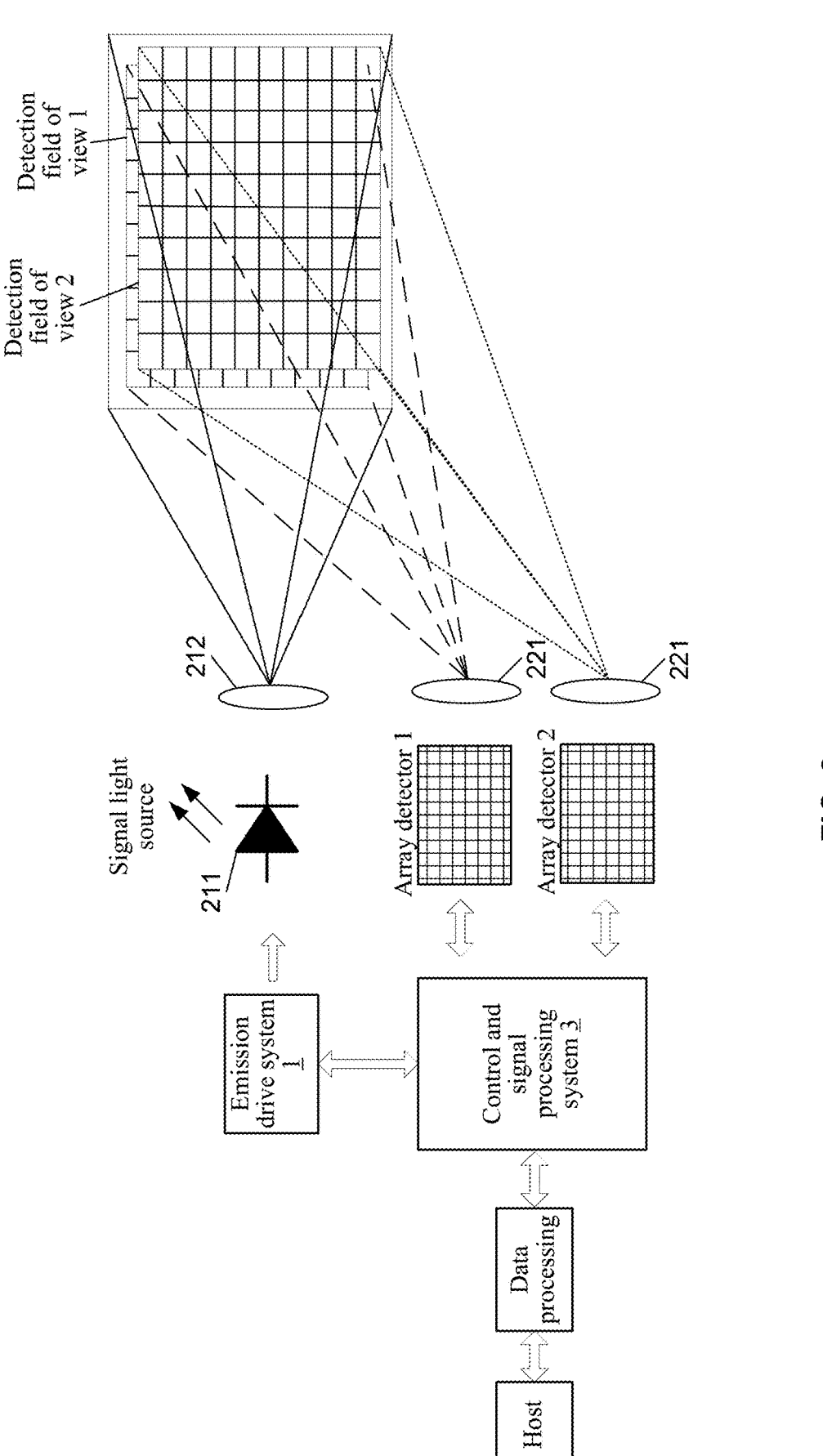
FIG. 8a is a schematic diagram of an optical path of a LiDAR having two receiving modules according to an embodiment of the present disclosure.

In some embodiments, as shown in FIG. 8a, the LiDAR 100 includes an emission drive system 1, a laser emission unit 211, an emission optical unit 212, two identical receiving modules, and a control and signal processing system 3 shared by the receiving modules. The emission drive system 1 is a laser-driven system, the laser emission unit 211 is LD, VCSEL, or LED, and the emission optical unit 212 is an optical shaping device.

Each receiving module 22 includes optical accessories such as array detectors (an array detector 1 and an array detector 2 respectively), a receiving lens, and a light filter. The array detector 1 and the array detector 2 are the same and both have the same pixel. Each of the receiving modules 22 has the same optical accessories such as a receiving lens and a related light filter. Divergence angles of the laser and the optical shaping device cover the entire detection region (60*45°), and the two identical receiving modules 22 have the same angle of view and detect the same region. The detection field of view of the array detector 2 is a detection field of view formed by shifting the detection field of view of the array detector 1 by ½ pixel in the horizontal direction and by ½ pixel in the vertical direction. That is, during mounting and debugging, the two detection regions are separated by an angle of ½ resolution, and a detection point cloud effect shown in FIG. 8b can be formed, a hollow dot is point cloud data read by the array detector 1, and the solid dot is point cloud data read by the array detector 2.

Figure 8B:
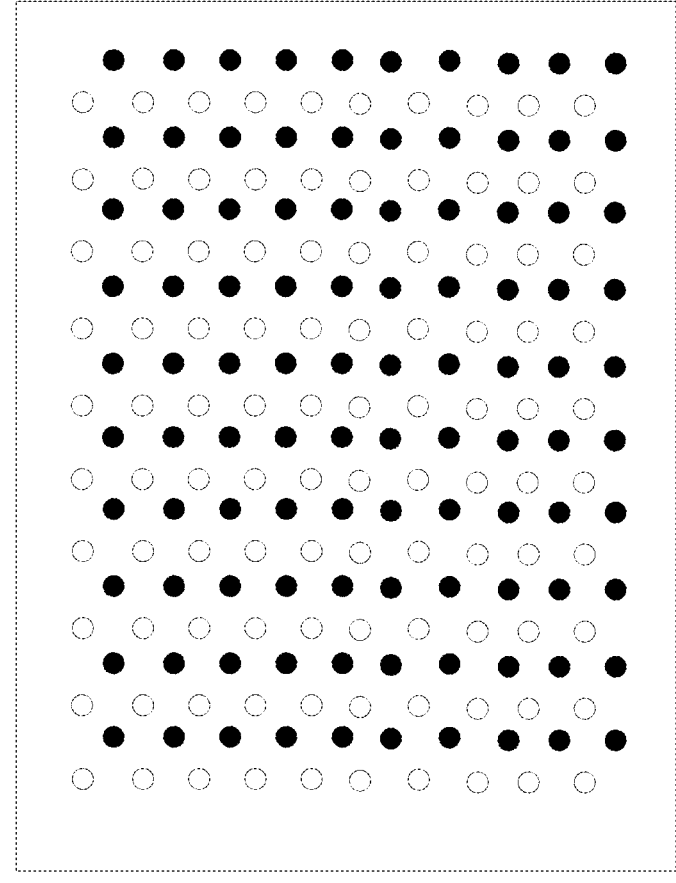

When a pixel fill factor of the array detector (that is, a ratio of a photosensitive region to the entire pixel region) is not high, referring to FIG. 8b, because another photosensitive region is added in one single pixel, the foregoing solution may be used to better improve actual angular resolution. When the pixel fill factor of the array detector is very large, the resolution can be improved for a smaller object during long-range detection.

Figure 9A:
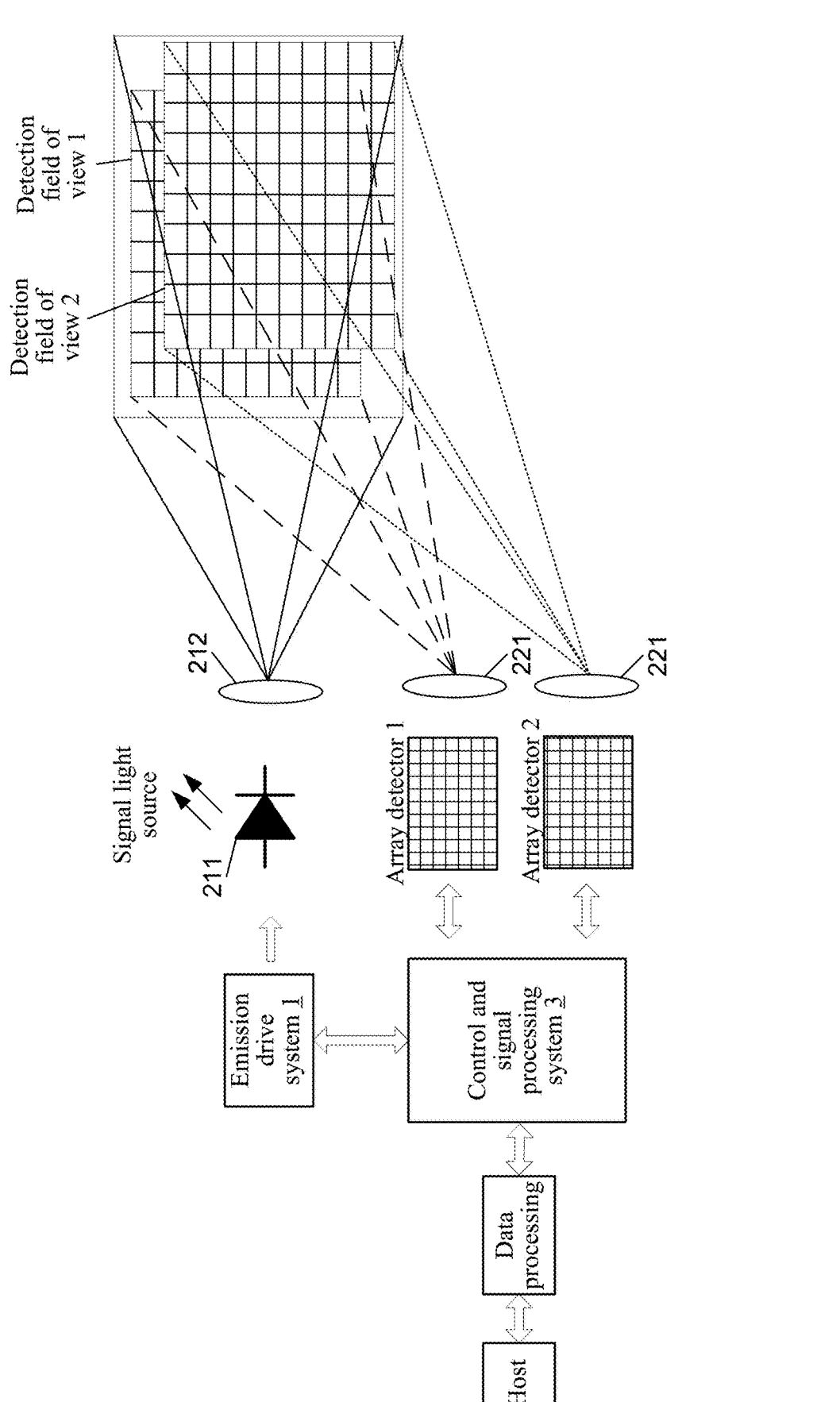
FIG. 9a is a schematic diagram of an optical path of a LiDAR having two receiving modules according to another embodiment of the present disclosure.
Figure 9B:
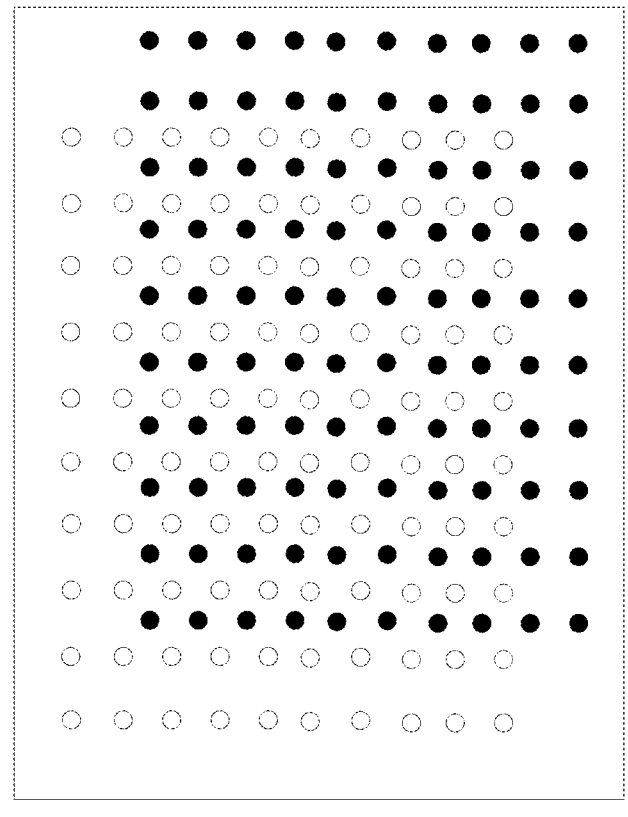

In another embodiment, the detection field of view of the array detector 2 may also be a detection field of view formed by shifting the detection field of view of the array detector 1 by M+½ pixels in the horizontal direction and N+½ pixels in the vertical direction. Both M and N are integers greater than or equal to zero. As shown in FIG. 9a, the detection field of view of the array detector 2 is the detection field of view obtained by shifting the detection field of view of the array detector 1 by 1+½ pixels in the horizontal direction and 1+½ pixels in the vertical direction. The detection point cloud effect shown in FIG. 9b can be formed. A hollow dot is point cloud data read by the array detector 1, and the solid dot is point cloud data read by the array detector 2. In addition, the angular resolution can be improved for the overlapped detection region of the two array detectors (that is, a detection region with two photosensitive regions in a single pixel).

Figure 10A:
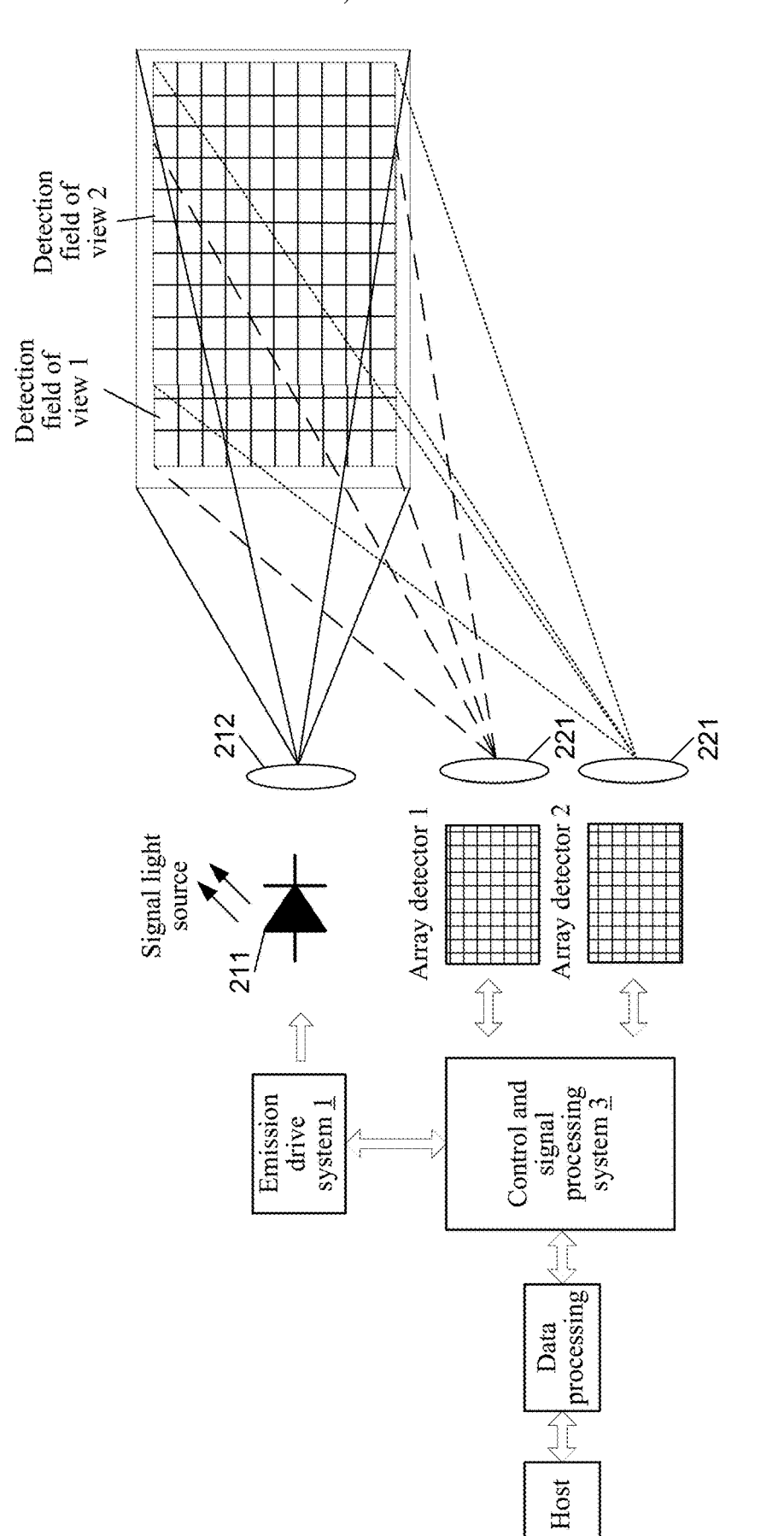
FIG. 10a is a schematic diagram of an optical path of a LiDAR having two receiving modules according to still another embodiment of the present disclosure.
Figure 10B:
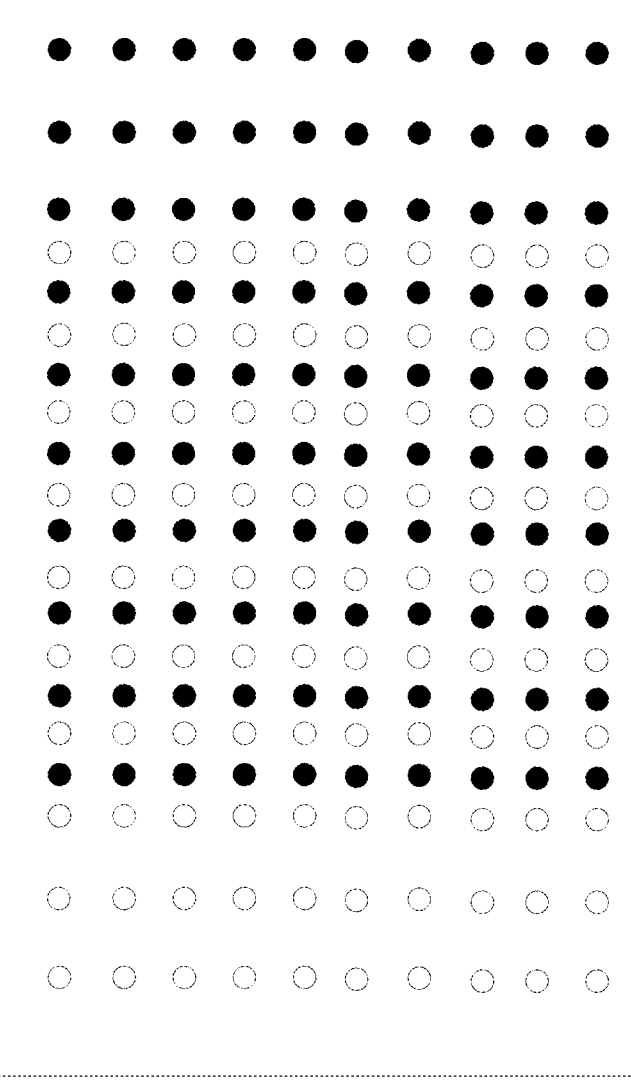

In another embodiment, the detection field of view of the array detector 2 may also be obtained by shifting the detection field of view of the array detector 1 by M+½ pixels in the horizontal direction. M is an integer greater than or equal to zero. As shown in FIG. 10a, the detection field of view of the array detector 2 is the detection field of view obtained by shifting the detection field of view of the array detector 1 by 2+½ pixels in the horizontal direction. The detection point cloud effect shown in FIG. 10b can be formed. A hollow dot is point cloud data read by the array detector 1, and the solid dot is point cloud data read by the array detector 2. In addition, the angular resolution can also be improved for the overlapped detection region of the two array detectors (that is, a detection region with two photosensitive regions in a single pixel).

Figure 11A:
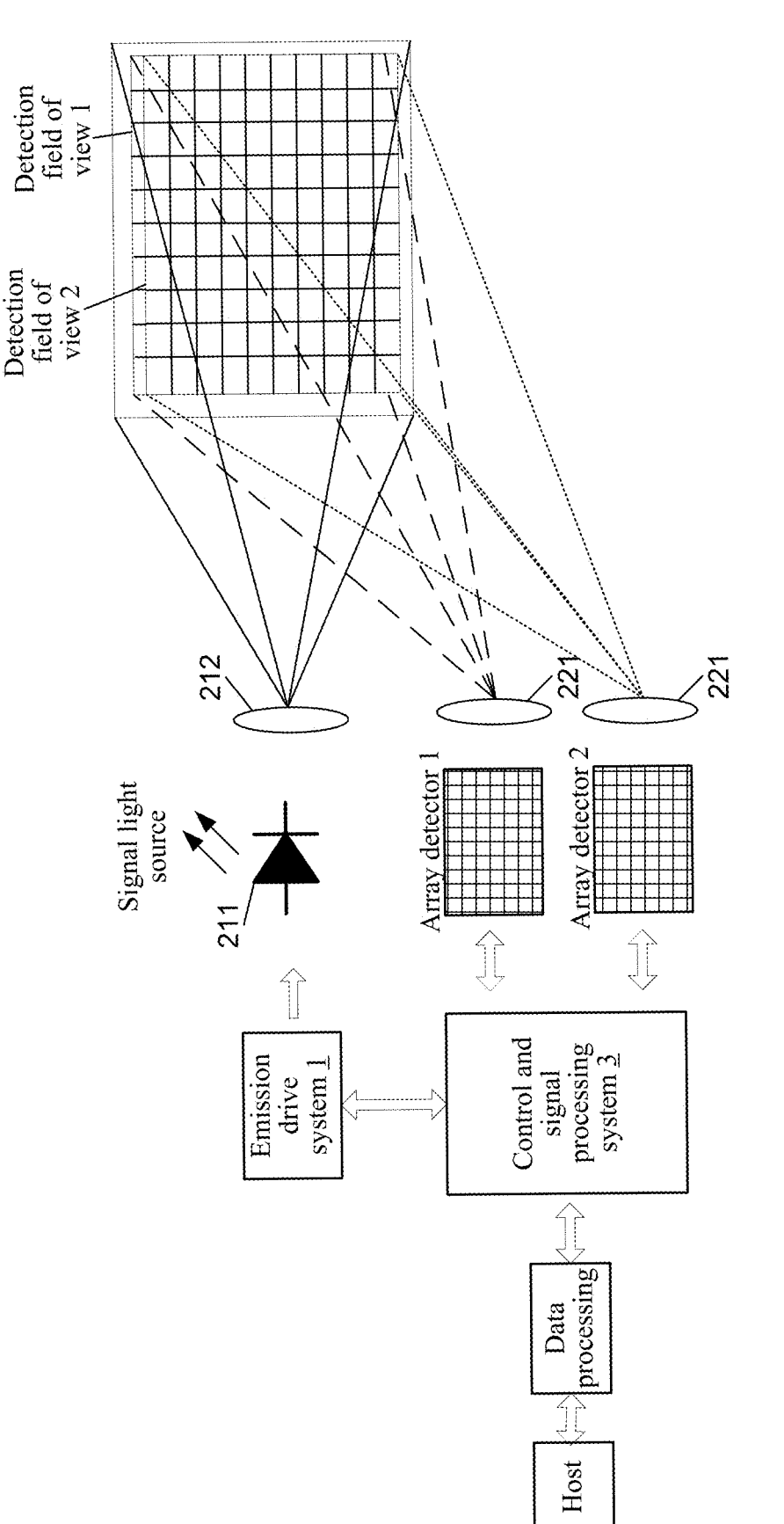
FIG. 11a is a schematic diagram of an optical path of a LiDAR having two receiving modules according to yet another embodiment of the present disclosure.
Figure 11B:
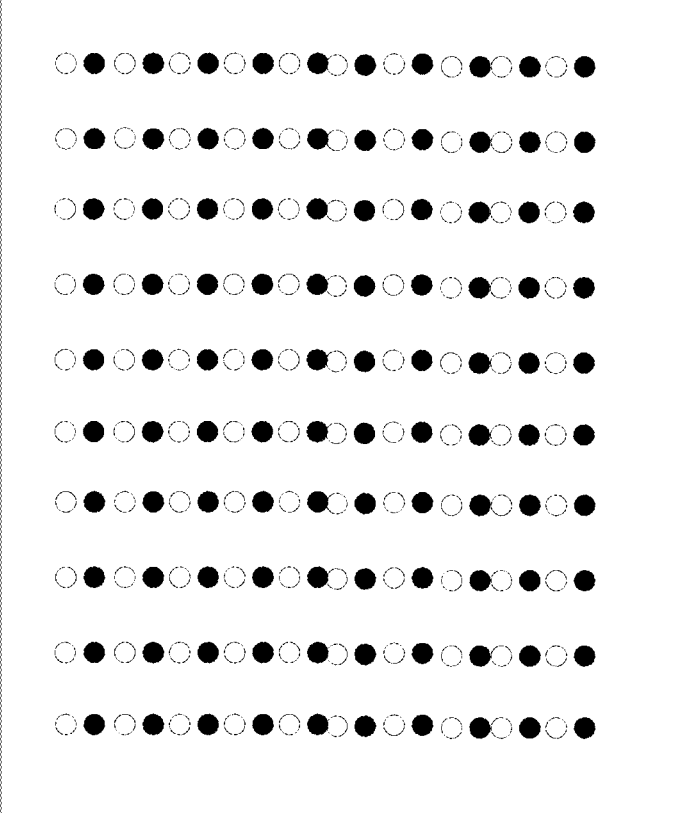
Figure 11B:

In another embodiment, the detection field of view of the array detector 2 may also be obtained by shifting the detection field of view of the array detector 1 by N+½ pixels in the vertical direction. N is an integer greater than or equal to zero. As shown in FIG. 11a, the detection field of view of the array detector 2 is the detection field of view obtained by shifting the detection field of view of the array detector 1 by 0+½ pixel (that is, ½ pixel) in the vertical direction. The detection point cloud effect shown in FIG. 11b can be formed. A hollow dot is point cloud data read by the array detector 1, and the solid dot is point cloud data read by the array detector 2. In addition, the angular resolution can also be improved for the overlapped detection region of the two array detectors (that is, a detection region with two photosensitive regions in a single pixel).

Figure 12A:
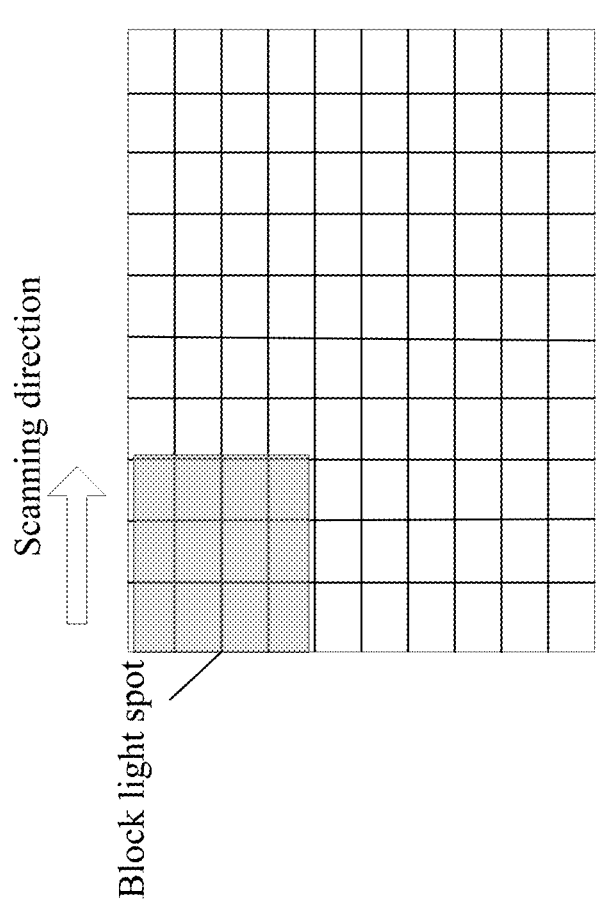
FIG. 12a is a schematic diagram of scanning of a block light spot according to an embodiment of the present disclosure.
Figure 12B:
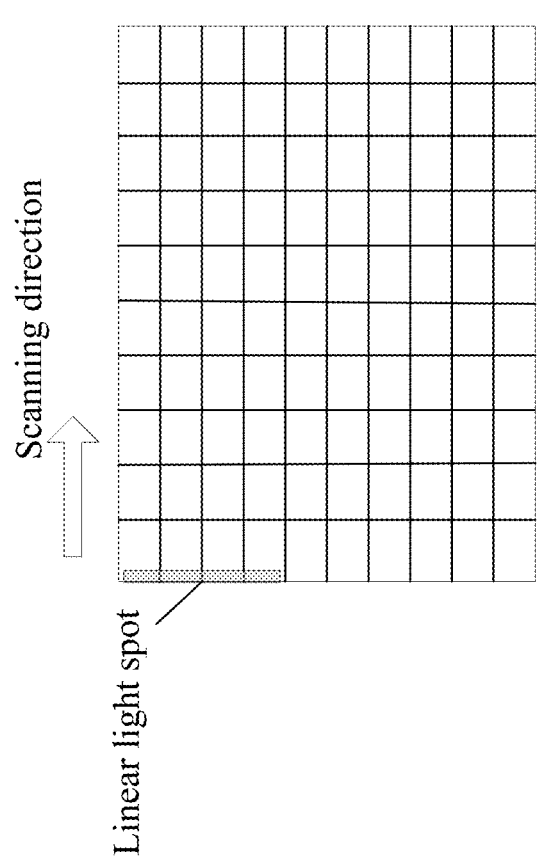
FIG. 12b is a schematic diagram of scanning of a linear light spot according to an embodiment of the present disclosure.

A light spot of the outgoing laser is the first light spot covering the entire detection field of view of the receiving module 22, where the light spot has a large divergence angle and is an overall spot; or the light spot of the outgoing laser may be the second light spot covering a part of the detection field of view of the receiving module 22, the second light spot is used to traversal-scan the entire detection field of view of the receiving module 22, where the receiving module 22 is configured to: when the second light spot scans a specific region of the entire detection field of view, detect the region. As shown in FIG. 12a, the second light spot may be a block light spot (small regional light spot) with a small divergence angle; and as shown in FIG. 12b, the second light spot may also be a linear light spot. The block light spot or the linear light spot covers the entire detection region in a traversal scan method, and the receiving module 22 respectively starts detection for the corresponding region. The traversal scan method of the block light spot or the linear light spot can help reduce emission energy, thereby reducing the power of the laser emission unit 211.

In this embodiment of the present disclosure, one emission module and at least two receiving modules corresponding to the emission module all work and share a rear-end processing and control circuit, thereby satisfying requirements for different detection resolutions in different regions within the same ranging period. Because there is no need to provide a plurality of ranging modules with different resolutions, a device is reduced, to reduce a product size, which improves an integration level, thereby facilitating correction afterward.

It should be noted that, in some other embodiments, the laser transceiver system 2 may further include a plurality of emission modules 21. Each emission module 21 includes one laser emission unit 211 and one emission optical unit 212. The number of receiving modules 22 is greater than the number of emission modules 21. For example, the laser transceiver system 2 includes two emission modules 21 and four receiving modules 22, and each emission module 21 corresponds to two receiving modules 22. In some embodiments, the laser transceiver system 2 includes two emission modules 21 and six receiving modules 22, and each emission module 21 corresponds to three receiving modules 22. In some embodiments, the laser transceiver system 2 includes three emission modules 21 and eight receiving modules 22, where the two emission modules 21 correspond to two receiving modules 22 respectively, and the other emission module 21 corresponds to three receiving modules 22. In the single-output multiple-input method (a single emission module 21 corresponds to a plurality of receiving modules 22), in the laser transceiver system 2, there is no need to separately provide a receiving module 22 corresponding to each emission module, thereby reducing product size.

Based on the forgoing LiDAR 100, an embodiment of the present disclosure proposes an autonomous driving apparatus 200, including the LiDAR 100 in the forgoing embodiment. The autonomous driving apparatus 200 may be a car, an airplane, a boat, or other related apparatuses where the LiDAR is used for intelligent sensing and detection. The autonomous driving apparatus 200 includes a driving apparatus body 201 and the LiDAR 100 in the forgoing embodiment. The LiDAR 100 is mounted on the driving apparatus body 201.

Figure 13:
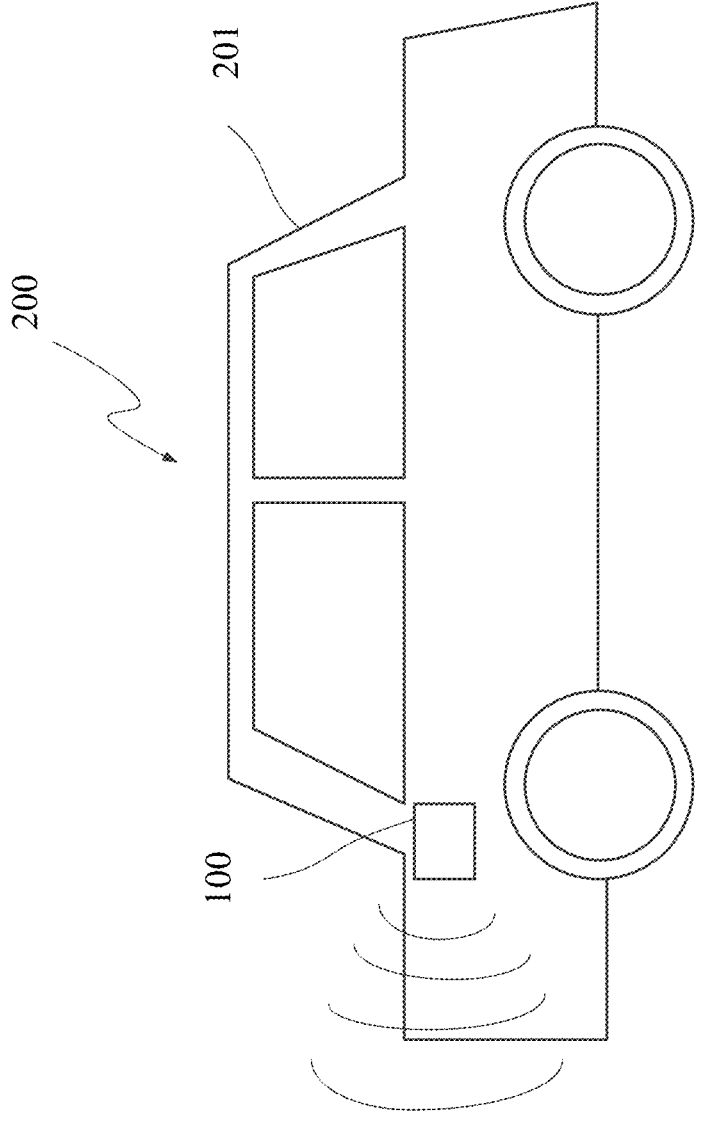
FIG. 13 is a schematic structural diagram of an autonomous driving apparatus according to an embodiment of the present disclosure.
Figure 14:
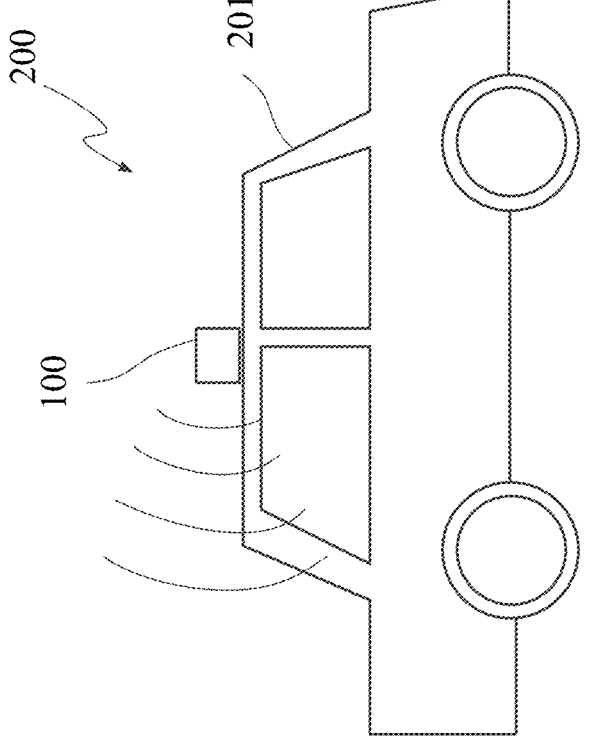
FIG. 14 is a schematic structural diagram of an autonomous driving apparatus according to another embodiment of the present disclosure.

As shown in FIG. 13, the autonomous driving apparatus 200 is an unmanned vehicle, and the LiDAR 100 is mounted on the side of the vehicle body. As shown in FIG. 14, the autonomous driving apparatus 200 is also an unmanned car, and the LiDAR 100 is mounted on a roof of a vehicle.

Finally, it should be noted that the foregoing embodiments are intended for describing instead of limiting the technical solutions of the present disclosure. Although the present disclosure is described in detail with reference to the foregoing embodiments, the person skilled in the art should understand that modifications may be made to the technical solutions described in the foregoing embodiments or equivalent replacements may be made to some or all technical features thereof, without departing from the scope of the technical solutions. All these modifications or replacements shall fall within the scope of the claims and specification of the present disclosure. Particularly, the technical features mentioned in all embodiments may be combined in any manner, provided that no structural conflict occurs. The present disclosure is not limited to the specific embodiments disclosed in this specification, but includes all technical solutions that fall within the scope of the claims.

What is claimed is:

1. A laser transceiver system, applied to a LiDAR, wherein the laser transceiver system comprises an emission module and a plurality of receiving modules corresponding to the emission module, wherein the emission module is configured to emit an outgoing laser; and wherein the plurality of receiving modules are configured to receive an echo laser, and the echo laser is a laser returning after the outgoing laser is reflected by an object in a detection region, wherein the receiving module comprises a first receiving module and a second receiving module, and there is shifting between the detection field of view of the first receiving module and the detection field of view of the second receiving module; and wherein an array detector of the first receiving module is the same as an array detector of the second receiving module; wherein the two array detectors have the same pixel; and wherein the detection field of view of the second receiving module is a detection field of view formed by shifting the detection field of view of the first receiving module by M+½ pixels in a horizontal direction or by N+½ pixels in a vertical direction, wherein M and N are both integers greater than or equal to zero.

2. The laser transceiver system according to claim 1, wherein the emission module comprises a laser emission unit and an emission optical unit, and each receiving module comprises a receiving optical unit and an array detector, the laser emission unit is configured to emit the outgoing laser;

wherein the emission optical unit is configured to collimate the outgoing laser and emit a collimated outgoing laser to the detection region;

wherein the receiving optical unit is configured to focus the echo laser and emit a focused echo laser to the array detector; and wherein the array detector is configured to receive the echo laser.

3. The laser transceiver system according to claim 1, wherein detection fields of view of at least two of the plurality of receiving modules are overlapped.

4. The laser transceiver system according to claim 3, wherein at least one of the plurality of receiving modules has an angle of view different from that of another receiving module.

5. The laser transceiver system according to claim 1, wherein at least one of the plurality of receiving modules has an angle of view different from that of another receiving module.

6. The laser transceiver system according to claim 5, wherein detection fields of view of at least two of the plurality of receiving modules are overlapped.

7. The laser transceiver system according to claim 2, wherein the receiving optical unit is a lens module, and a lens module of at least one receiving module has a focal length different from that of a lens module of another receiving module.

8. The laser transceiver system according to claim 2, wherein a pixel size of at least one array detector is different from a pixel size of another array detector.

9. The laser transceiver system according to claim 1, wherein the receiving module comprises a first receiving module, a second receiving module, and a third receiving module, wherein a detection field of view of the third receiving module is located within a detection field of view of the second receiving module; and wherein the detection field of view of the second receiving module is located within a detection field of view of the first receiving module.

10. The laser transceiver system according to claim 1, wherein a light spot of the outgoing laser is a first light spot covering the entire detection field of view of the receiving module; or wherein the light spot of the outgoing laser is a second light spot covering a part of the detection field of view of the receiving module, the second light spot is used to traversal-scan the entire detection field of view of the receiving module, and the receiving module is configured to: when the second light spot scans a specific region of the entire detection field of view, detect the region.

11. The laser transceiver system according to claim 10, wherein the second light spot is a block light spot or a linear light spot.

12. A LiDAR, comprising a laser transceiver system, an emission drive system, and a control and signal processing system, wherein the laser transceiver system comprises an emission module and a plurality of receiving modules corresponding to the emission module;

wherein the emission module is configured to emit an outgoing laser;

wherein the plurality of receiving modules are configured to receive an echo laser, and the echo laser is a laser returning after the outgoing laser is reflected by an object in a detection region;

wherein the emission drive system is used to drive the emission module; and wherein the control and signal processing system is used to control the emission drive system to drive the emission module, and to control the receiving module to receive the echo laser, wherein the receiving module comprises a first receiving module and a second receiving module, and there is shifting between the detection field of view of the first receiving module and the detection field of view of the second receiving module; and wherein an array detector of the first receiving module is the same as an array detector of the second receiving module; wherein the two array detectors have the same pixel; and wherein the detection field of view of the second receiving module is a detection field of view formed by shifting the detection field of view of the first receiving module by $M+\frac{1}{2}$ pixels in a horizontal direction or by $N+\frac{1}{2}$ pixels in a vertical direction, wherein M and N are both integers greater than or equal to zero.

13. An autonomous driving apparatus, comprising a driving apparatus body and a LiDAR mounted on the driving apparatus body, wherein the LiDAR comprises a laser transceiver system, an emission drive system, and a control and signal processing system, wherein the laser transceiver system comprises an emission module and a plurality of receiving modules corresponding to the emission module;

wherein the emission module is configured to emit an outgoing laser;

wherein the plurality of receiving modules are configured to receive an echo laser, and the echo laser is a laser returning after the outgoing laser is reflected by an object in a detection region;

wherein the emission drive system is used to drive the emission module; and wherein the control and signal processing system is used to control the emission drive system to drive the emission module, and to control the receiving module to receive the echo laser, wherein the receiving module comprises a first receiving module and a second receiving module, and there is shifting between the detection field of view of the first receiving module and the detection field of view of the second receiving module; and wherein an array detector of the first receiving module is the same as an array detector of the second receiving module; wherein the two array detectors have the same pixel; and wherein the detection field of view of the second receiving module is a detection field of view formed by shifting the detection field of view of the first receiving module by $M+\frac{1}{2}$ pixels in a horizontal direction or by $N+\frac{1}{2}$ pixels in a vertical direction, wherein M and N are both integers greater than or equal to zero.

\* \* \* \* \*